United States Patent
Yang et al.

(10) Patent No.: US 8,320,505 B2
(45) Date of Patent: Nov. 27, 2012

(54) APPARATUS AND METHOD FOR RECEIVER IN MULTIPLE ANTENNA SYSTEM

(75) Inventors: Joo-Yeol Yang, Suwon-si (KR); Sung-Soo Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1029 days.

(21) Appl. No.: 12/315,322

(22) Filed: Dec. 2, 2008

(65) Prior Publication Data
US 2009/0141835 A1 Jun. 4, 2009

(30) Foreign Application Priority Data
Dec. 3, 2007 (KR) .................. 10-2007-0124193

(51) Int. Cl.
*H04L 27/06* (2006.01)
(52) U.S. Cl. ........ 375/340; 375/316; 375/341; 375/219; 375/267; 375/347; 455/130; 455/132; 455/133
(58) Field of Classification Search .................. 375/340, 375/316, 341, 219, 267, 347; 455/130, 132, 455/133
See application file for complete search history.

(56) References Cited

U.S. PATENT DOCUMENTS
2008/0279299 A1* 11/2008 Reuven et al. ................. 375/267

FOREIGN PATENT DOCUMENTS
KR 1020070052037 A 5/2007
KR 1020070099950 A 10/2007

OTHER PUBLICATIONS
Akinori Nakajima, et al., "Turbo Coded MIMO Multiplexing with Iterative Adaptive Soft Parallel Interference Cancellation", 2004 IEEE, p. 1410-1414.

\* cited by examiner

*Primary Examiner* — Zewdu Kassa

(57) ABSTRACT

Detection apparatus and method for achieving performance close to a Maximum Likelihood (ML) detection having optimal performance and reducing computational complexity in a Multiple-Input Multiple-Output (MIMO) system including a plurality of transmit antennas and receive antennas are provided. The apparatus includes a hard decision part for confirming an initial hard decision value of a receive symbol vector; a candidate symbol selector for selecting candidate symbols restricted to neighbor values of the initial hard decision value; and an interference canceller for canceling interference in the selected candidate symbols and selecting a final candidate symbol from the received symbols using a result of the interference cancellation.

20 Claims, 9 Drawing Sheets

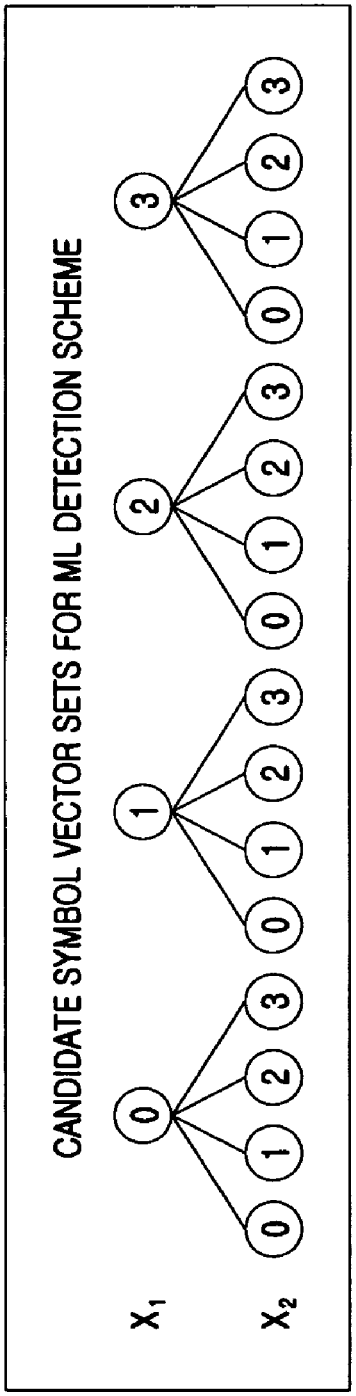
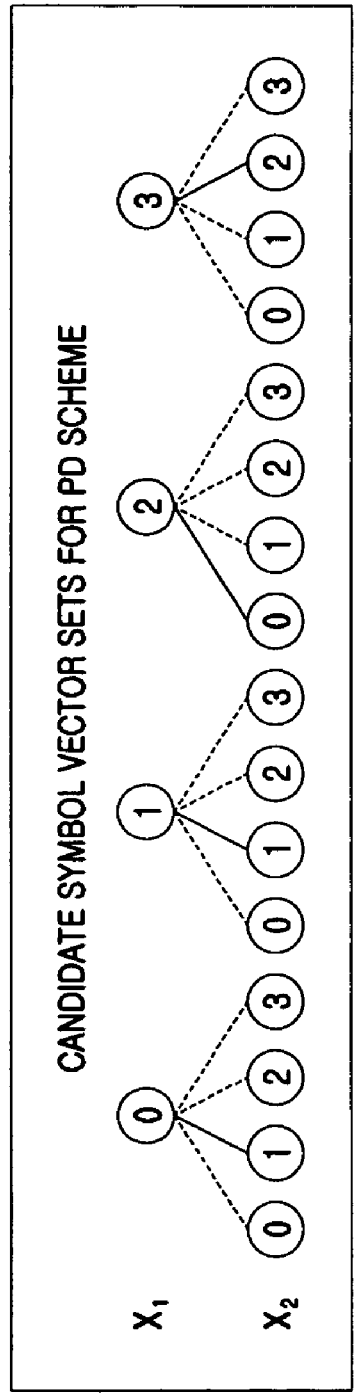

| MODULATION ORDER | SPATIAL SPREADING FACTOR (ROUNDED OFF) | | |
| --- | --- | --- | --- |
| | BELOW $T_1$dB | OVER $T_1$dB AND BELOW $T_2$dB | OVER $T_2$dB |
| QPSK | 1 CANDIDATE SYMBOL (MMSE) | 3 CANDIDATE SYMBOLS (MMSE-MML) | 4 CANDIDATE SYMBOLS (MML) |
| 16QAM | 1 CANDIDATE SYMBOL (MMSE) | 7 CANDIDATE SYMBOLS (MMSE-MML) | 16 CANDIDATE SYMBOLS (MML) |
| 64QAM | 1 CANDIDATE SYMBOL (MMSE) | 33 CANDIDATE SYMBOLS (MMSE-MML) | 64 CANDIDATE SYMBOLS (MML) |

FIG.7

| MODULATION ORDER | | MML | MMSE-MML-CSS | MMSE | ADAPTIVE |
|---|---|---|---|---|---|
| COMPUTATIONAL COMPLEXITY (NO. OF CANDIDATE SYMBOLS) | Min. | 64 | 33 | 1 | 1 |
| | Avg. | 64 | 33 | 1 | 40 |
| | Max. | 64 | 33 | 1 | 64 |
| IMPLEMENTATION COMPLEXITY (NO. OF CANDIDATE SYMBOLS) | | 64 | 33 | 1 | 64 |

FIG.8B

APPARATUS AND METHOD FOR RECEIVER IN MULTIPLE ANTENNA SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 3, 2007 and assigned Serial No. 10-2007-0124193, the entire disclosure of which is hereby incorporated by reference.

TECHNICAL FIELD OF THE INVENTION

The present invention relates generally to a detection method and structure for achieving performance close to a Maximum Likelihood (ML) detection having an optimal performance and reducing a computational complexity in a Multiple-Input Multiple-Output (MIMO) system including a plurality of transmit antennas and receive antennas.

BACKGROUND OF THE INVENTION

Recently, rapid growth of the wireless mobile communication market requires various multimedia services in a wireless environment. Particularly, massive transmit data and high-speed data delivery are in progress. In this respect, the most urgent task is to find a method for efficiently utilizing limited frequencies. For doing so, a new transmission technology using multiple antennas is demanded (for example, a Multiple-Input Multiple-Output (MIMO) system using multiple antennas).

The MIMO technique employs the multiple antennas at the transmitter and the receiver. Compared to a Single-Input Single-Output (SISO) system, the MIMO system can increase a channel transmission capacity in proportion to the number of the antennas without requiring additional frequencies or transmit power allocation, on which researches are conducted.

The multi-antenna techniques are largely divided into a spatial diversity scheme which enhances a transmission reliability by obtaining a diversity gain corresponding to the product of the numbers of the transmit antennas and the receive antennas, a Spatial Multiplexing (SM) scheme which raises the data rate by transmitting a plurality of signal streams at the same time, and a scheme incorporating the spatial diversity and the multiplexing.

When transmitters send different data streams using the SM scheme of the multi-antenna technology, interference occurs between the transmitted data. The receiver detects the signal using a Maximum Likelihood (ML) receiver with consideration to the influence of the interference signal, or detects the signal after canceling the interference. The interference cancellation methods include Zero Forcing, Minimum Mean Square Error (MMSE), and so on. In the general SM scheme, the performance of the receiver is in a tradeoff relation with the computational complexity of the receiver. Researches are conducted on reception algorithms for lowering the computational complexity of the receiver and achieving performance close to the ML receiver.

The multi-antenna system transmits and receives data via the multiple antennas of the transmitter and the receiver. For example, using n-ary transmit antennas and m-ary receive antennas, the receive signal can be expressed as Equation 1:

$$y = Hx + u \Rightarrow \begin{bmatrix} y_1 \\ y_2 \\ \vdots \\ y_m \end{bmatrix} = \begin{bmatrix} h_{11} & h_{12} & \cdots & h_{1n} \\ h_{21} & h_{22} & \cdots & h_{2n} \\ \vdots & \vdots & \vdots & \vdots \\ h_{m1} & h_{m2} & \cdots & h_{mn} \end{bmatrix} \begin{bmatrix} x_1 \\ x_2 \\ \vdots \\ x_n \end{bmatrix} + \begin{bmatrix} u_1 \\ u_2 \\ \vdots \\ u_m \end{bmatrix}. \quad \text{[Eqn. 1]}$$

In Equation 1, y denotes a receive signal vector, $y_i$ denotes the receive signal at the i-th receive antenna, H denotes a channel matrix, and $h_{ij}$ denotes a channel gain between the j-th transmit antenna and the i-th receive antenna.

X denotes a transmit symbol vector, $x_j$ denotes the transmit symbol via the j-th transmit antenna, u denotes a background noise, and $u_i$ denotes a background noise of the i-th receive antenna.

The receiver can perform ML detection to acquire optimal reception performance with the receive signal based on Equation 2. ML detection greatly enhances performance by calculating Euclidean distances and selecting a symbol vector having the shortest straight distance.

$$\hat{x} = \underset{x \in A}{\text{argmin}} \|y - Hx\|^2. \quad \text{[Eqn. 2]}$$

In Equation 2, A denotes every possible candidate symbol vector set of the transmit symbol vector X. Given a modulation order M, A includes Mn-ary candidate symbol vectors in total.

Disadvantageously, as the modulation order of the transmit symbol and the number of the transmit antennas increase, the computations in the ML detection exponentially increase.

Meanwhile, Equation 2 pertains to ML detection according to a hard decision without considering a channel decoder. With respect to the channel decoder, it is necessary to calculate a Log Likelihood Ratio (LLR) for each data bit based on Equation 3:

$$\begin{aligned} L(b_\lambda \mid y, H) &= \ln \frac{Pr(b_\lambda = 0 \mid y, H)}{Pr(b_\lambda = 1 \mid y, H)} \\ &= \ln \frac{\displaystyle\sum_{x_\lambda \in A_{\lambda=0}} \exp\left(-\frac{\|y - Hx_\lambda\|^2}{\sigma_u^2}\right)}{\displaystyle\sum_{x_\lambda \in A_{\lambda=1}} \exp\left(-\frac{\|y - Hx_\lambda\|^2}{\sigma_u^2}\right)} \\ &\approx \frac{\displaystyle\min_{x_\lambda \in A_{\lambda=1}} \|y - Hx_\lambda\|^2 - \min_{x_\lambda \in A_{\lambda=0}} \|y - Hx_\lambda\|^2}{\sigma_u^2}. \end{aligned} \quad \text{[Eqn. 3]}$$

To calculate the LLRs based on Equation 3, it is necessary to calculate symbol vectors corresponding to cases according to values of the bits of each symbol. In so doing, complicated detection is required.

To address this problem, a Parallel Detection (PD) is utilized.

FIGS. 1A and 2B depict candidate symbols of ML detection and a PD scheme of a general receiving apparatus.

To explain the differences between ML detection and the PD scheme, the receiving apparatus is assumed to include two transmit antennas and two receive antennas and to adopt a Quadrature Phase Shift Keying (QPSK) modulation.

FIG. 1A depicts the candidate symbols according to ML detection of the general receiving apparatus.

Referring to FIG. 1A, ML detection of the receiving apparatus uses every combination of the symbols $x_1$ and $x_2$ transmitted via the transmit antennas with the candidate symbols and generates sixteen (=4×4) candidate symbol vectors in total.

FIG. 1B depicts the candidate symbols according to the PD scheme of the general receiving apparatus.

Referring to FIG. 1B, the receiving apparatus selects one of the symbols transmitted via the two transmit antennas, cancels interference in the receive signal in every possible case of the symbol, and determines the other symbol through slicing. Thus, the number of the candidate symbol vectors used in the receiving apparatus is reduced to four. As such, the PD scheme can lower the complexity of the apparatus in calculating the Euclidean distance.

The PD scheme of the receiving apparatus is now described.

The receiving apparatus selects one (e.g., $x_1$) of the two transmit symbols (e.g., $x_1$ and $x_2$) and cancels interference in every candidate symbol of the selected symbol (e.g., $x_1$).

Next, the receiving apparatus determines a candidate symbol value of the other transmit signal symbol (e.g., $x_2$) using the receive signal changed through the interference cancellation.

The above-mentioned PD scheme features a lower complexity than ML detection in calculating the Euclidean distance with similar performance to ML detection. Disadvantageously, without considering channel decoding, when channel decoding is actually required, abnormal operations result in the LLR calculation.

FIG. 2 depicts shortcomings in the PD scheme of the general receiving apparatus.

More particularly, FIG. 2 shows the remaining candidate symbol values of the other transmit signal symbol (e.g., $x_2$) after the PD of the receiving apparatus.

The candidate symbol values are divided to right and left according to their first bit of $x_2$ along the y axis. The receiving apparatus needs to find the shortest Euclidean distance in the case 203 where the first bit is 0 and in the case 201 where the first bit is 1. Since there are no candidate symbol values for the first bit '1' as shown in FIG. 2, abnormal operations result in the LLR calculation.

To address this abnormal operation, a Modified ML (MML) (Korean Application Publication No. 10-2007-0052037 titled "APPARATUS AND METHOD FOR GENERATING LLR IN MIMO COMMUNICATION SYSTEM") can be used. However, since every candidate symbol value is used for the symbols including the corresponding bit to avoid the abnormal operation, Euclidean distances are computed for M-ary candidate symbol vectors. As a result, as the modulation order increases, the computational complexity is still problematic.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide a method and an apparatus for an adaptive reception to adjust the number of candidate symbol vectors according to a channel condition in a Multiple-Input Multiple-Output (MIMO) system.

Another aspect of the present invention is to provide an apparatus and a method for reducing a computational complexity in calculating Euclidean distances in a MIMO system.

Yet another aspect of the present invention is to provide an apparatus and a method for preventing abnormal operations in calculating a Log Likelihood Ratio (LLR) in a MIMO system.

According to an aspect of the present invention, a receiving apparatus in a multi-antenna system includes a hard decision part for confirming an initial hard decision value of a receive symbol vector; a candidate symbol selector for selecting candidate symbols restricted to neighbor values of the initial hard decision value; an interference canceller for canceling interference in the selected candidate symbols and selecting a final candidate symbol with respect to other receive symbols using a result of the interference cancellation; and a symbol estimator for estimating a receive symbol using the final candidate symbol.

According to another aspect of the present invention, a receiving method in a multi-antenna system includes confirming an initial hard decision value of a receive symbol vector; selecting candidate symbols restricted to neighbor values of the initial hard decision value; canceling interference in the selected candidate symbols and selecting final candidate symbols with respect to other receive symbol using a result of the interference cancellation; and estimating a receive symbol using the final candidate symbols.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A is a diagram of candidate symbols in a Maximum Likelihood (ML) detection of a general receiving apparatus;

FIG. 1B is a diagram of candidate symbols in a Parallel Detection (PD) of the general receiving apparatus;

FIG. 7 is a candidate symbol mapping table for determining the number of candidate symbols in the receiving apparatus according to an exemplary embodiment of the present invention;

FIG. 8B is a table showing the computational complexity of the MML of the general receiving apparatus and the receiving method of the present receiving apparatus.

Throughout the drawings, like reference numerals will be understood to refer to like parts, components and structures.

DETAILED DESCRIPTION OF EXEMPLARY EMBODIMENTS

FIGS. 3 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a receiving apparatus and a receiving method for adjusting the number of candidate symbol vectors according to a channel condition in a Multiple-Input Multiple-Output (MIMO) system.

Figure 2:
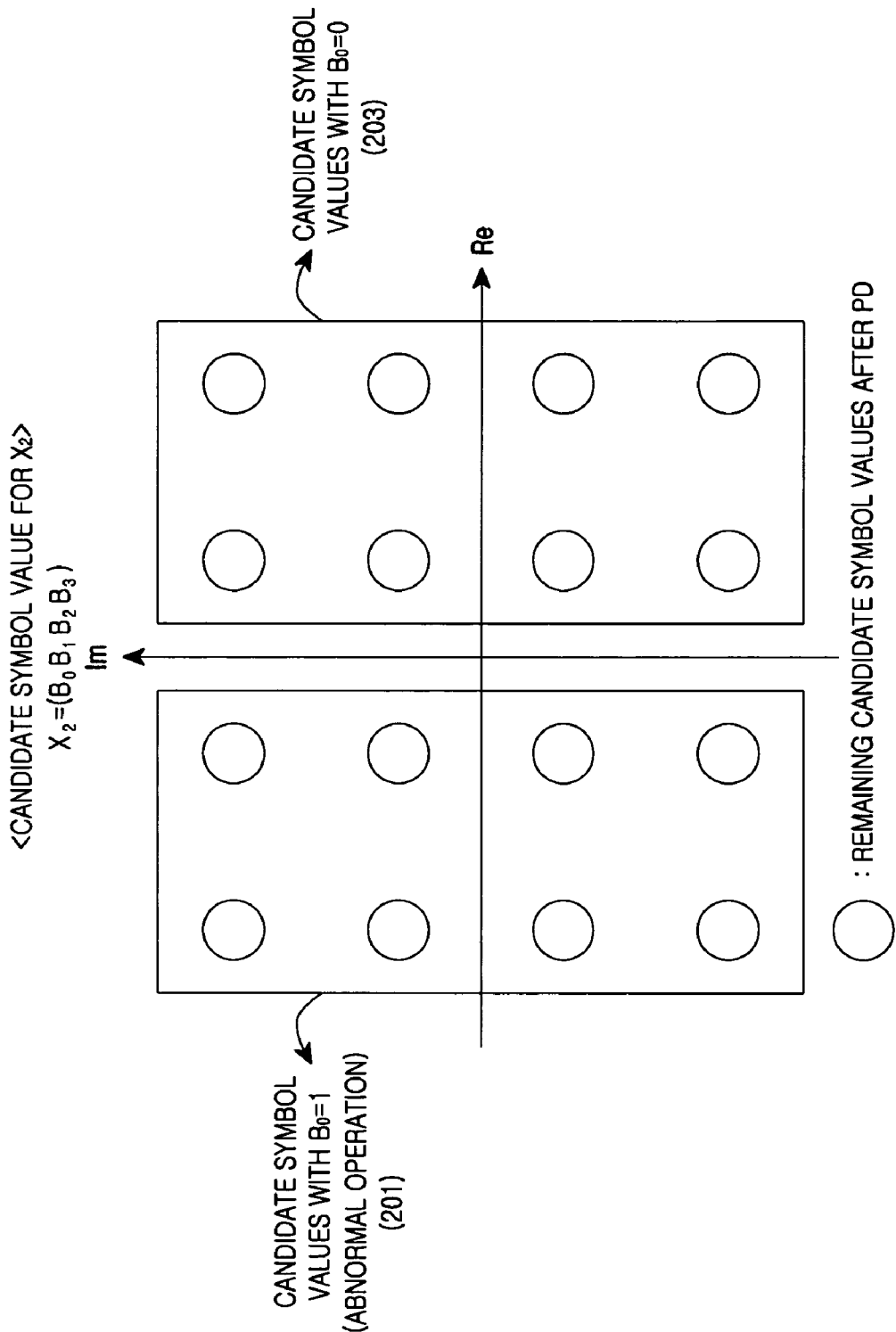
FIG. 2 is a diagram showing shortcomings of the PD of the general receiving apparatus.
Figure 3:
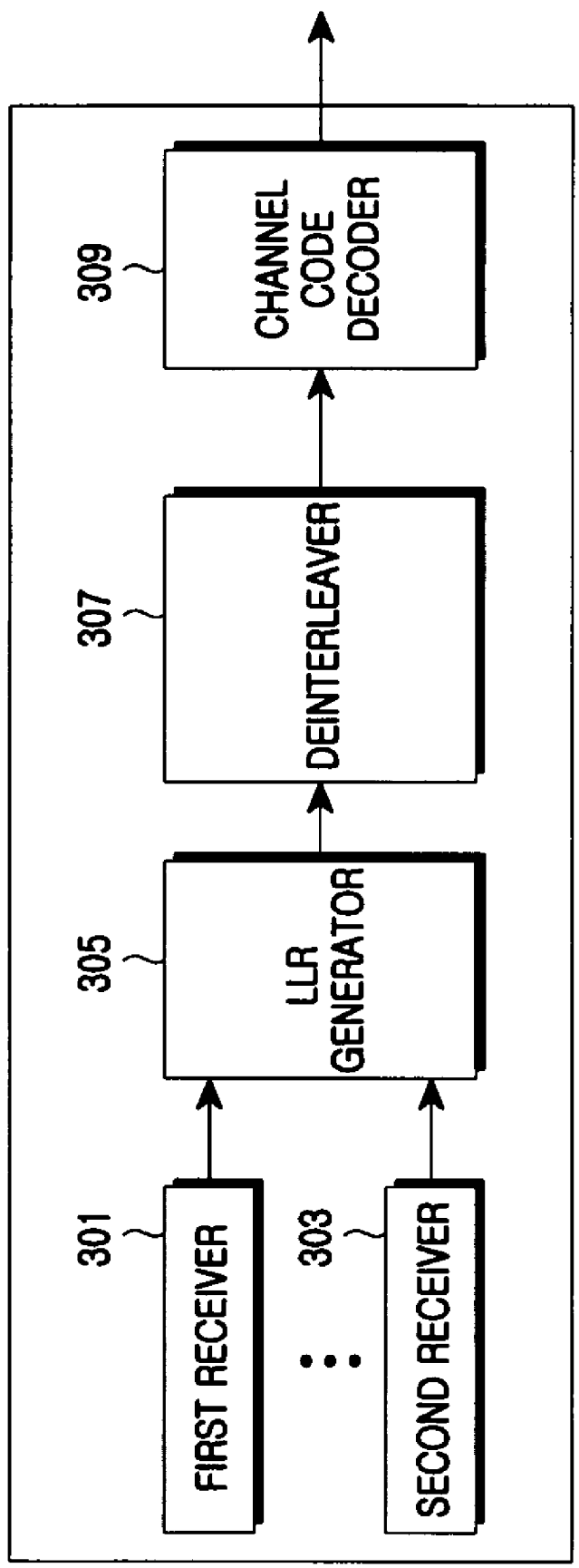
FIG. 3 is a detailed block diagram of a multi-antenna receiving apparatus according to an exemplary embodiment of the present invention.

FIG. 3 is a detailed block diagram of a multi-antenna receiving apparatus according to an exemplary embodiment of the present invention.

The receiving apparatus of FIG. 3 includes a certain number of receivers (that is, K-ary receivers 301 through 303), a Log Likelihood Ratio (LLR) generator 305, a deinterleaver 307, and a channel code decoder 309.

The receivers 301 through 303 of the receiving apparatus generate estimate vectors corresponding a transmit signal vector x from a receive signal vector y.

The LLR generator 305 calculates a spatial spreading factor value and defines the number of candidate symbols using the calculated spatial spreading factor value. Next, the LLR generator 305 selects a candidate symbol vector according to the interference cancellation of the selected candidate symbols and calculates LLRs of data bits using Euclidean distances.

The deinterleaver 307 deinterleaves the symbols output from a demodulator of the receiving apparatus according to a given rule and outputs the bits of the modulated signal in their original order.

The channel code decoder 309 receives the LLRs from the deinterleaver 307 and acquires an information bit stream transmitted from the transmitter based on the received LLRs.

Figure 4:
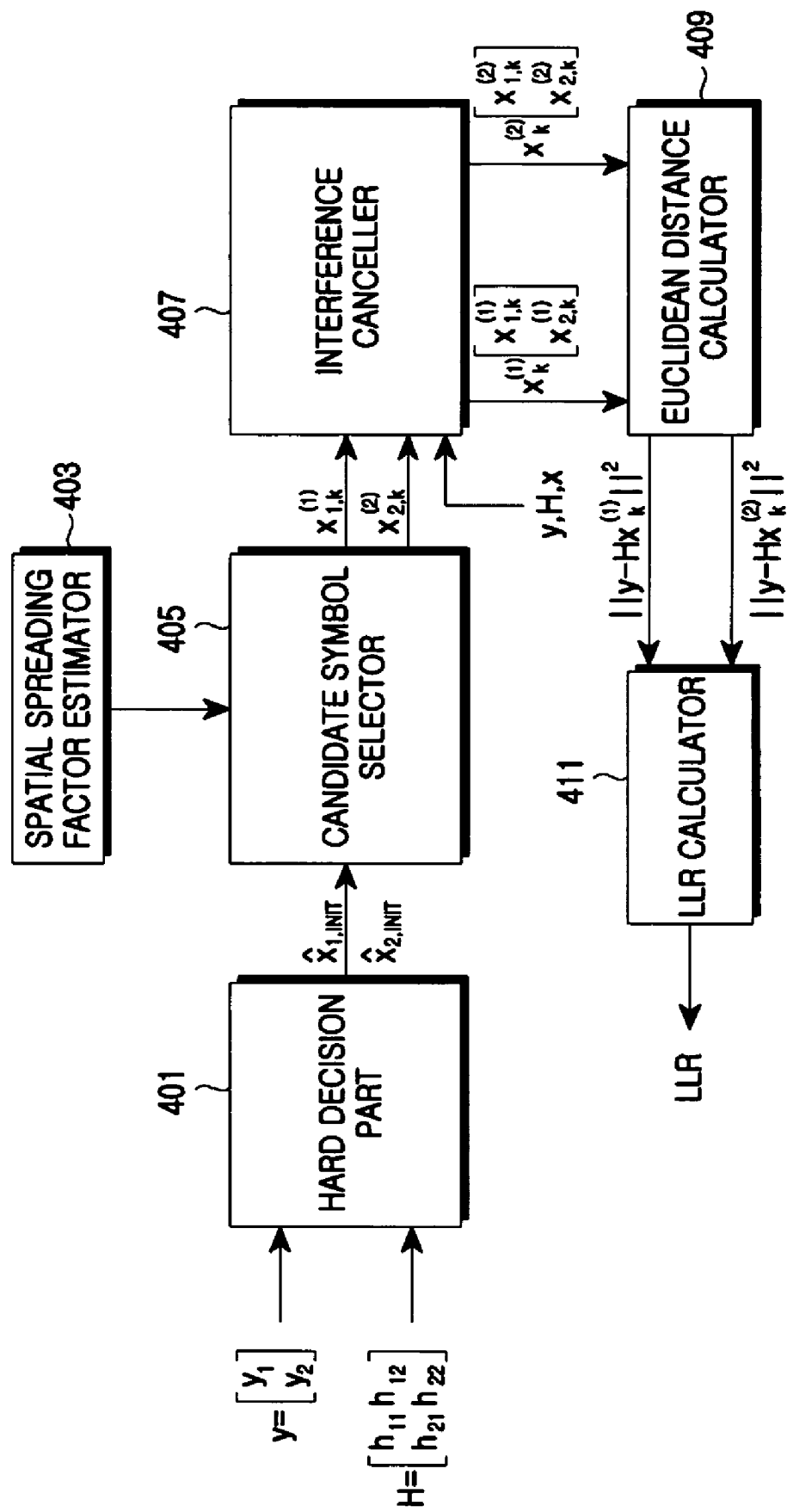
FIG. 4 is a block diagram of a multi-antenna Log Likelihood Ratio (LLR) generator according to an exemplary embodiment of the present invention.

The LLR generator 305 is described in more detail in reference to FIG. 4.

FIG. 4 is a block diagram of the multi-antenna LLR generator according to an exemplary embodiment of the present invention. The LLR generator can include a hard decision part 401, a candidate symbol selector 405, a spatial spreading factor estimator 403, an interference canceller 407, a Euclidean distance calculator 409, and an LLR calculator 411.

The hard decision part 401 of the LLR generator confirms an initial hard decision value of the hard decision on the receive symbol vector. Herein, although the hard decision part 401 can perform the hard decision through many ways, the hard decision can be executed here using a Minimum Mean Square Error (MMSE)-nulling method.

The spatial spreading factor estimator 403 calculates the spatial spreading factor value to select the candidate symbols. The candidate symbol selector 405 determines the number of the candidate symbols based on the spatial spreading factor using a candidate symbol mapping table.

The candidate symbol mapping table arranges the number of the candidate symbols based on the spatial spreading factor and the modulation order. The candidate symbol selector 405 can determine the number of the candidate symbols using the candidate symbol mapping table which arranges the modulation orders (such as QPSK, 16QAM, and 64QAM) and the spatial spreading factors below $T_1$dB, over $T_1$dB and below $T_2$dB, and over $T_2$dB.

The interference canceller 407 cancels the interference in the candidate symbols selected by the candidate symbol selector 405, performs the interference rejection, and selects the final candidate symbol vector.

The Euclidean distance calculator 409 calculates Euclidean distances of the K-ary estimate vectors using the K-ary estimate vectors acquired from the multiple receivers (that is, the K-ary receivers and the receive signal vector y) and provides the Euclidean distances to the LLR calculator 411.

The LLR calculates 411 computes LLRs of the data bits using the Euclidean distances output from the Euclidean distance calculator 409.

So far, the receiving apparatus of the MIMO system adjusts the number of the candidate symbol vectors depending on the channel condition. Now, descriptions explain a receiving method of the receiving apparatus in the MIMO system for adjusting the number of the candidate symbol vectors based on the channel condition.

Figure 5:
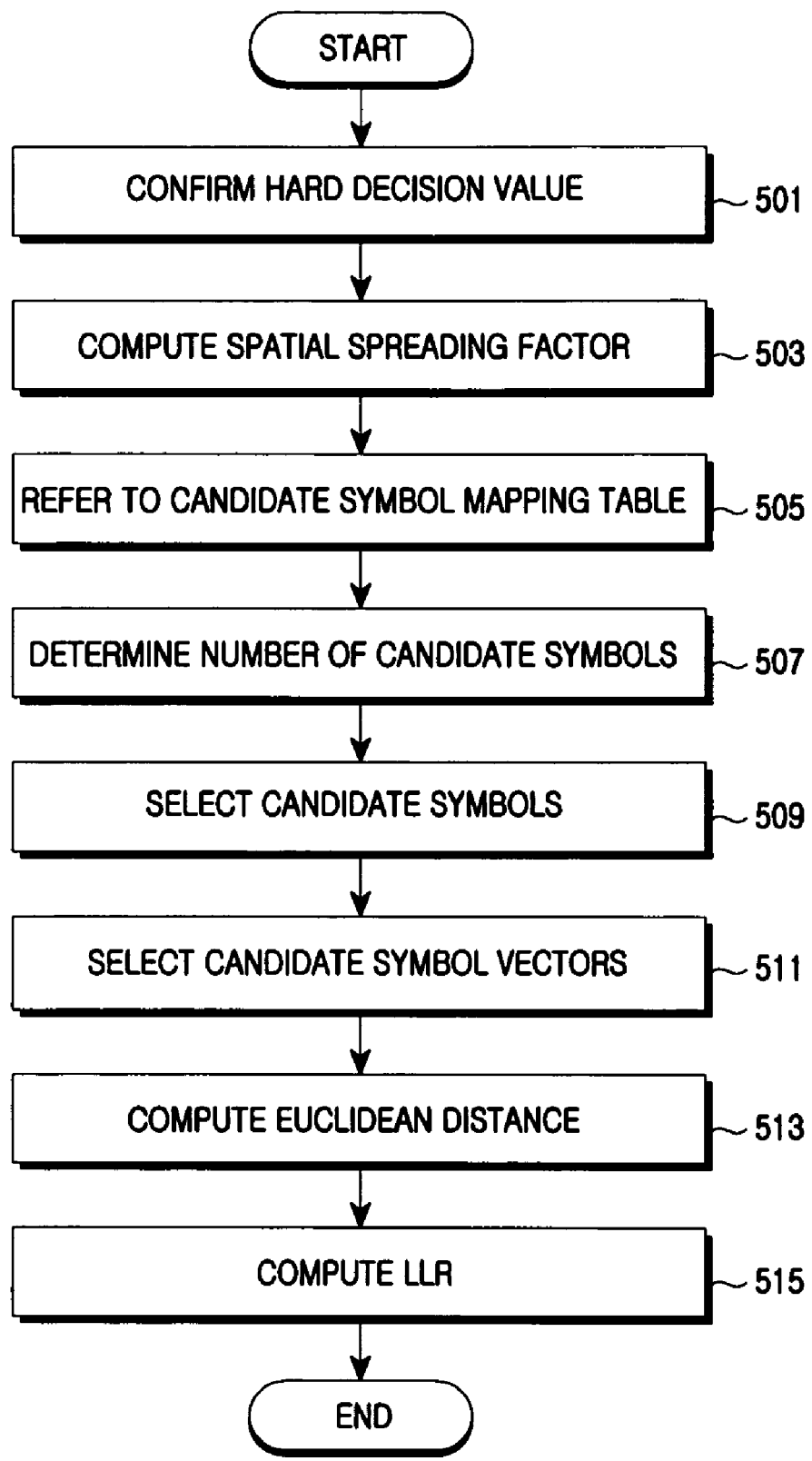
FIG. 5 is a flowchart of a method for calculating the LLR in the receiving apparatus according to an exemplary embodiment of the present invention.

FIG. 5 is a flowchart illustrating a method for calculating the LLR in the receiving apparatus according to an exemplary embodiment of the present invention. In calculating the LLR, it assumed that the MIMO system employs two transmit antennas and two receive antennas. The receiving apparatus receives a signal as expressed in Equation 4:

$$y = H_X + u \Rightarrow \begin{bmatrix} y_1 \\ y_2 \\ \vdots \\ y_m \end{bmatrix} = \begin{bmatrix} h_{11} & h_{12} & \cdots & h_{1n} \\ h_{21} & h_{22} & \cdots & h_{2n} \\ \vdots & \vdots & \vdots & \vdots \\ h_{m1} & h_{m2} & \cdots & h_{mn} \end{bmatrix} \begin{bmatrix} x_1 \\ x_2 \\ \vdots \\ x_n \end{bmatrix} + \begin{bmatrix} u_1 \\ u_2 \\ \vdots \\ u_m \end{bmatrix}. \quad \text{[Eqn. 4]}$$

In Equation 4, y denotes a receive signal vector, $y_i$ denotes the receive signal at the i-th receive antenna, H denotes a channel matrix, and $h_{ij}$ denotes a channel gain between the j-th transmit antenna and the i-th receive antenna.

X denotes a transmit symbol vector, $x_j$ denotes the transmit symbol of the j-th transmit antenna, u denotes a background noise, and $u_i$ denotes a background noise of the i-th receive antenna.

In step 501, the receiving apparatus confirms the initial hard decision value of the receive symbol vector. Herein, provided that the receiving apparatus performs the hard decision using the MMSE-nulling scheme, the initial decision value can be confirmed based on Equation 5:

$$z = \begin{bmatrix} z_1 \\ z_2 \end{bmatrix} = W_{MMSE} y = \left( H^H + \frac{\sigma_u^2}{\sigma_x^2} I \right)^{-1} H^H y \quad \text{[Eqn. 5]}$$

$$\Rightarrow \hat{x}_{init} = \begin{bmatrix} \hat{x}_{1,init} \\ \hat{x}_{2,init} \end{bmatrix} = \begin{bmatrix} Q(z_1) \\ Q(z_2) \end{bmatrix}.$$

In Equation 5, z denotes the changed receive signal after the MMSE nulling, and $W_{MMSE}$ denotes a weight matrix multiplied by the receive signal for the MMSE nulling. $\sigma_u^2$ denotes an average power of the background noise, $\sigma_x^2$ denotes an average power of the transmit symbol, and $\hat{x}_{init}$ denotes the initial hard decision value of the symbol vector.

Next, the receiving apparatus calculates the spatial spreading factor in step 503 and refers to the candidate symbol mapping table in step 505. Herein, the spatial spreading factor value indicates an eigenvector of Hermitian(H)*H with respect to the channel matrix H. The candidate symbol mapping table arranges the numbers of the candidate symbols based on the spatial spreading factor values, to be explained in reference to FIG. 7.

The receiving apparatus determines the number of the candidate symbols corresponding to the calculated spatial spreading factor value in step 507, and selects the candidate symbols corresponding to the number of the candidate symbols in step 509.

Herein, the receiving apparatus can select one to M-ary (=modulation order) candidate symbols. When a single candidate symbol is selected, the MMSE reception method is applied. When the M-ary candidate symbols are received, the MML reception method is applied. For example, using the 64QAM modulation scheme, the receiving apparatus selects one candidate symbol with the MMSE reception method or 64 candidate symbols with the MML reception method based on the candidate symbol mapping table of FIG. 7. Alternatively, the receiving apparatus cans select 33 candidate symbols with the MMSE-MML reception method. In the MMSE-MML reception, the receiving apparatus utilizes a cross-shaped pattern of FIG. 6 to select neighbor symbols after the MMSE hard decision. Thus, the operations of the channel decoder can be enhanced by preventing the abnormal operation in the LLR calculation of the PD scheme.

Next, the receiving apparatus selects candidate symbol vectors according to the interference cancellation of the selected candidate symbols in step 511, and computes Euclidean distances using the selected candidate symbol vectors in step 513.

After rejecting the interference in the candidate symbols based on Equation 6 and Equation 7, the receiving apparatus can select other candidate symbol vectors:

$$z_k^{(1)} = y - h_1 \hat{x}_{1,k}^{(1)} \Rightarrow \begin{bmatrix} z_{1,k}^{(1)} \\ z_{2,k}^{(1)} \end{bmatrix} = \begin{bmatrix} y_1 \\ y_2 \end{bmatrix} - \begin{bmatrix} h_{11} \\ h_{21} \end{bmatrix} \hat{x}_{1,k}^{(1)} \quad \text{[Eqn. 6]}$$

$$k \in \{0, 1, \ldots, M-1\}$$

$$\hat{x}_{2,k}^{(1)} = Q(h_2^H z_k^{(1)}) \; k \in \{0, 1, \ldots C-1\}, \; h_2 = \begin{bmatrix} h_{12} \\ h_{22} \end{bmatrix}.$$

In Equation 6, $z_k^{(1)}$ denotes the vector of the receive signal changed by the interference cancellation of the signal received via the first antenna, and $\hat{x}_{1,k}^{(1)}$ denotes the candidate symbol value of the signal $x_1$ received over the first antenna. $\hat{x}_{2,k}^{(1)}$ denotes the other candidate symbol vector calculated using the vector of the changed receive signal. C denotes the total number of the first hard decision value and the neighbor candidate values. C is equal to or smaller than the modulation order M.

$$z_k^{(2)} = y - h_2 \hat{x}_{2,k}^{(2)} \Rightarrow \begin{bmatrix} z_{1,k}^{(2)} \\ z_{2,k}^{(2)} \end{bmatrix} = \begin{bmatrix} y_1 \\ y_2 \end{bmatrix} - \begin{bmatrix} h_{12} \\ h_{22} \end{bmatrix} \hat{x}_{2,k}^{(2)} \quad \text{[Eqn. 7]}$$

$$k \in \{0, 1, \ldots, M-1\}$$

$$\hat{x}_{1,k}^{(2)} = Q(h_1^H z_k^{(2)}) \; k \in \{0, 1, \ldots C-1\}, \; h_1 = \begin{bmatrix} h_{11} \\ h_{21} \end{bmatrix}.$$

In Equation 7, $z_k^{(2)}$ denotes the vector of the receive signal changed by the interference cancellation of the signal received via the second antenna, and $\hat{x}_{2,k}^{(2)}$ denotes the candidate symbol value of the signal $x_2$ received over the second antenna. $\hat{x}_{2,k}^{(2)}$ denotes the other candidate symbol vector calculated using the vector of the changed receive signal. C denotes the total number of the first hard decision value and the neighbor candidate values. C is equal to or smaller than the modulation order M.

More specifically, Equation 6 and Equation 7 are used to select the other candidate symbol vector after rejecting the interference in the candidate symbols in the MIMO receiver, which is assumed to include two receive antennas. Equation 6 expresses the selection of the other candidate symbol vector using the receive signal vector changed through the interference cancellation after the interference is rejected in the signal received via the first antenna. Equation 7 expresses the selection of the other candidate symbol vector using the receive signal vector changed through the interference cancellation after the interference is rejected in the second signal received via the second antenna.

Next, the receiving apparatus computes the LLRs in step 515 and then finishes this process.

Figure 6:
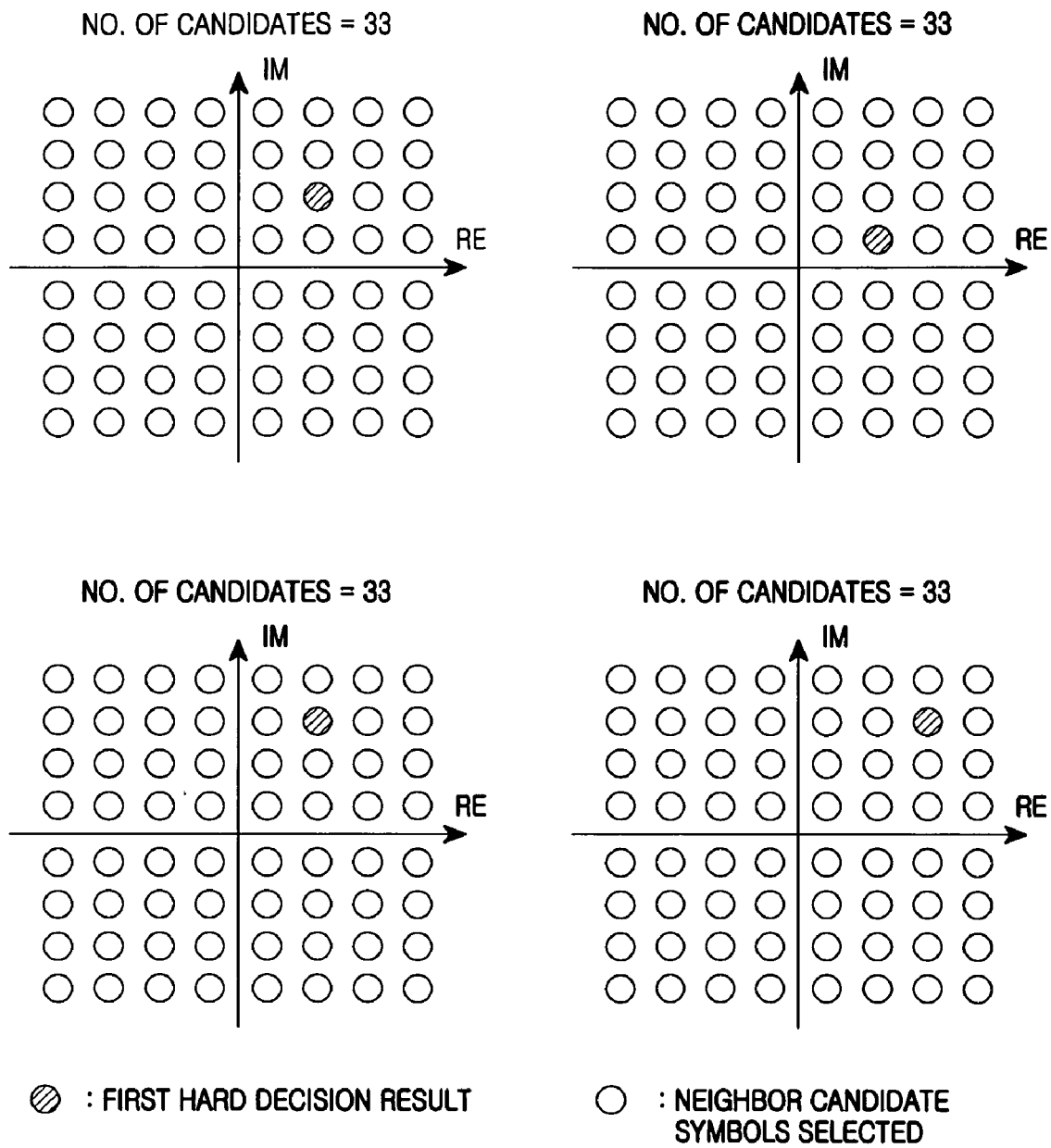
FIG. 6 is a diagram showing a method for selecting neighbor symbols in the receiving apparatus according to an exemplary embodiment of the present invention.

FIG. 6 illustrates how to select neighbor symbols in the receiving apparatus according to an exemplary embodiment of the present invention.

Referring to FIG. 6, the receiving apparatus selects neighbor symbols based on the MMSE hard decision value in the MMSE-MML reception.

To avoid the abnormal operation in the LLR calculation of the conventional PD scheme, the receiving apparatus can utilize the cross-shaped pattern of FIG. 6.

FIG. 6 depicts the neighbor symbols selected in the receiving apparatus using the 64QAM modulation scheme. The candidate symbols are selected in the cross-shaped pattern around the shaded hard decision result.

FIG. 7 shows the candidate symbol mapping table for determining the number of candidate symbols in the receiving apparatus according to an exemplary embodiment of the present invention.

The candidate symbol mapping table of FIG. 7 is arranged according to an exemplary embodiment of the present invention. In some cases, the candidate symbol mapping table of FIG. 7 can be further optimized. For instance, while the number of the candidate symbol in the MMSE-MML is shown as one here to ease understanding, the number of the candidate symbols in the MMSE-MML may vary.

Referring to FIG. 7, the candidate symbol mapping table can be defined according to the spatial spreading factor of the modulation order. The receiving apparatus can determine the number of the candidate symbols using the candidate symbol mapping table which arranges the modulation orders of QPSK, 16QAM, and 64QAM and the spatial spreading factors below $T_1$dB, over $T_1$dB and below $T_2$dB, and over $T_2$dB. Herein, the spatial spreading factor value can be converted (rounded off) to an integer number.

As one can see in FIG. 7, the number of the candidate symbols selected by the receiving apparatus ranges from 1 to M. When a single candidate symbol is selected, the MMSE reception is applied. When the M-ary candidate symbols are received, the MML reception is applied. For example, using the 64QAM modulation, the receiving apparatus can select one candidate symbol in the MMSE reception and 64 candidate symbols in the MML reception based on the candidate symbol mapping table of FIG. 7. Also, the receiving apparatus can select 33 candidate symbols in the MMSE-MML reception.

Figure 8A:
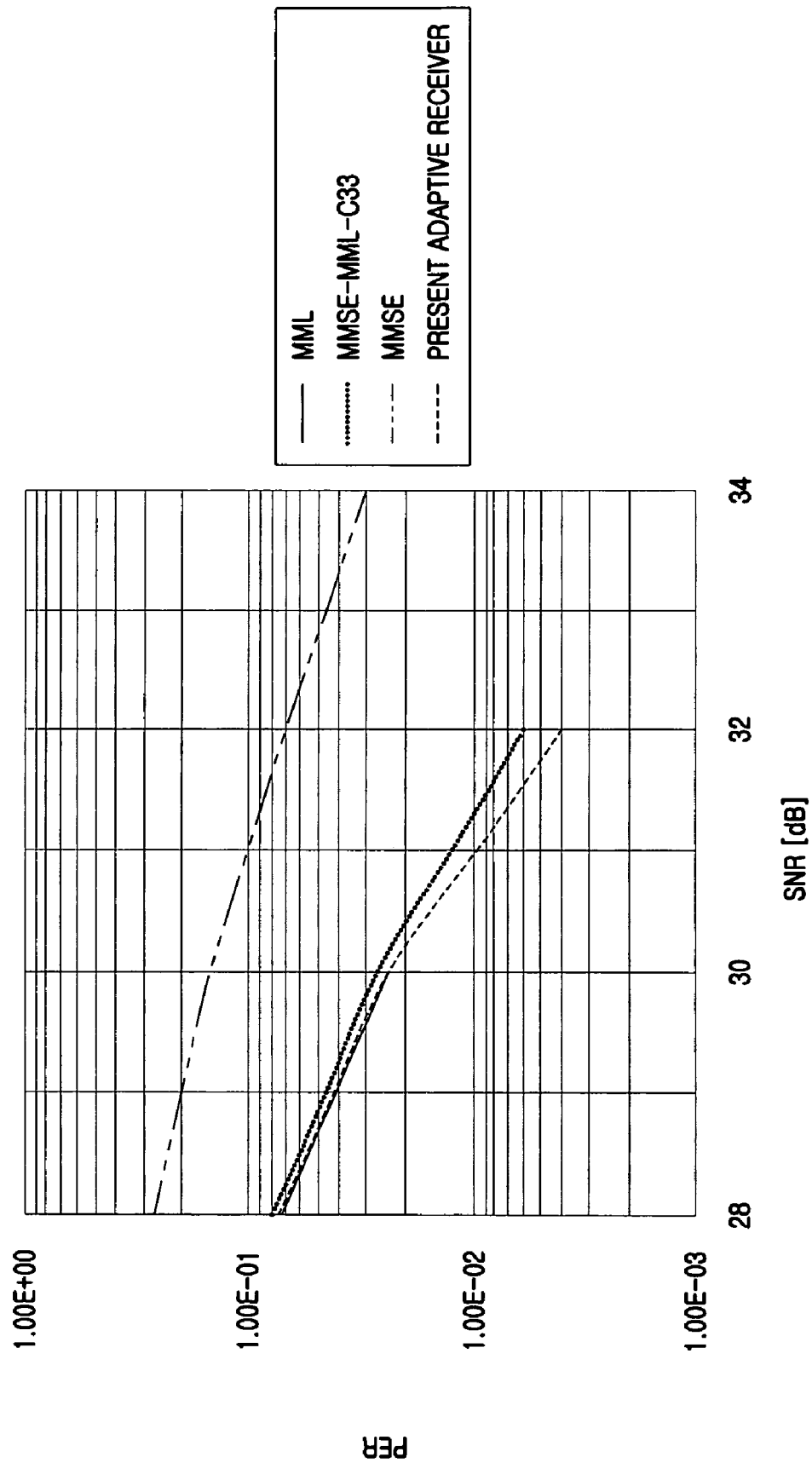
FIG. 8A is a graph for comparing a performance of the Modified ML (MML) of the general receiving apparatus and the receiving method of the present receiving apparatus.

FIGS. 8A and 8B compare the reception performance of the present receiving apparatus and a general receiving apparatus.

FIG. 8A is a graph for comparing the performance of the Modified ML (MML) receiving method of a general receiving apparatus and the receiving method of the present receiving apparatus.

Referring to FIG. 8A, the performance of the receiving method of the present receiving apparatus is measured under the following conditions:

1. Mobile WiMax system (MIMO-Orthogonal Frequency Division Multiplexing (OFDM) system including two transmit antennas and two receive antennas);
2. Ped A channel model, mobile speed 3 km/h→channel estimator operation (including channel estimation error); and
3. 64QAM, Convolutional Turbo Code (CTC) code rate 5/6

In those conditions, C, which is the parameter indicative of the number of the candidate symbols, is set to 1, 33 and 64 to compare the reception performance. Notably, the performance of the present receiving apparatus is higher than that of the general receiving apparatuses.

FIG. 8B shows the computational complexity of the MML of the general receiving apparatus and the receiving method of the present receiving apparatus.

The computational complexity in FIG. 8B is required to acquire the results of FIG. 8A. In determining thresholds of the spatial spreading factors, performance degradation is rarely results. The ultimate computational complexity of the present receiving apparatus is lowered.

As set forth above, the receiving method and the receiving apparatus adjust the number of the candidate symbol vectors based on the channel condition in the MIMO system. Therefore, it is possible to address the abnormal operations in the LLR calculation, which result in the conventional PD scheme and MML scheme, and to reduce the number of the candidate vectors.

That is, the present invention can accomplish performance similar to conventional MML by attaining computational complexity reduction gain and minimizing performance degradation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving apparatus in a multi-antenna system, comprising:
    a hard decision part configured to confirm an initial hard decision value of a receive symbol vector;
    a candidate symbol selector configured to select one or more candidate symbols restricted to neighbor values of the initial hard decision value;
    an interference canceller configured to cancel interference in the selected candidate symbols and select a final candidate symbol among the received symbols using a result of the interference cancellation; and
    a symbol estimator configured to estimate a receive symbol using the final candidate symbol,
    wherein the candidate symbol selector is configured to determine the number of candidate symbols by referring to a candidate symbol mapping table which defines the number of candidate symbols based on a modulation order and a spatial spreading factor value, and select candidate symbols corresponding to the number of the candidate symbols.

2. The receiving apparatus of claim 1, wherein the symbol estimator comprises:
    a Euclidean distance calculator configured to calculate Euclidean distances of the selected candidate symbols; and
    a Log Likelihood Ratio (LLR) calculator configured to calculate Log Likelihood Ratios of data bits using the acquired Euclidean distances.

3. The receiving apparatus of claim 1, wherein the candidate symbol mapping table defines the number of candidate symbols based on the modulation order and the spatial spreading factor value as follows:

| Modulation order | Spatial spreading factor (rounded off) | | |
|---|---|---|---|
| | below $T_1$ dB | over $T_1$ dB and below $T_2$ dB | over $T_2$ dB |
| QPSK | 1 candidate symbol (MMSE) | 3 candidate symbols (MMSE-MML) | 4 candidate symbols (MML) |
| 16QAM | 1 candidate symbol (MMSE) | 7 candidate symbols (MMSE-MML) | 16 candidate symbols (MML) |
| 64QAM | 1 candidate symbol (MMSE) | 33 candidate symbols (MMSE-MML) | 64 candidate symbols (MML). |

4. The receiving apparatus of claim 3, wherein the candidate symbol selector prevents abnormal operations in the LLR calculation by selecting candidate symbols within a cross-shaped range based on the initial hard decision value.

5. The receiving apparatus of claim 1, wherein the hard decision part confirms the initial hard decision value of the receive symbol vector based on the following equation:

$$z = \begin{bmatrix} z_1 \\ z_2 \end{bmatrix} = W_{MMSE} y = \left( H^H + \frac{\sigma_u^2}{\sigma_x^2} I \right)^{-1} H^H y$$

$$\Rightarrow \hat{x}_{init} = \begin{bmatrix} \hat{x}_{1,init} \\ \hat{x}_{2,init} \end{bmatrix} = \begin{bmatrix} Q(z_1) \\ Q(z_2) \end{bmatrix}$$

where z denotes a receive signal changed after a Minimum Mean Square Error (MMSE) nulling, $W_{MMSE}$ denotes a weight matrix multiplied by the receive signal for the MMSE nulling, $\sigma_u^2$ denotes an average power of a background noise, $\sigma_x^2$ denotes an average power of a transmit symbol, and $\hat{x}_{init}$ denotes the initial hard decision value of the symbol vector.

6. The receiving apparatus of claim 1, wherein the candidate symbol selector selects the candidate symbols from the received symbols based on the following equations:

$$z_k^{(1)} = y - h_1 \hat{x}_{1,k}^{(1)} \Rightarrow \begin{bmatrix} z_{1,k}^{(1)} \\ z_{2,k}^{(1)} \end{bmatrix} = \begin{bmatrix} y_1 \\ y_2 \end{bmatrix} - \begin{bmatrix} h_{11} \\ h_{21} \end{bmatrix} \hat{x}_{1,k}^{(1)}$$

$$k \in \{0, 1, \ldots, M-1\}$$

$$\hat{x}_{2,k}^{(1)} = Q(h_2^H z_k^{(1)}) \; k \in \{0, 1, \ldots C-1\}, h_2 = \begin{bmatrix} h_{12} \\ h_{22} \end{bmatrix}$$

where $z_k^{(1)}$ denotes a vector of a receive signal changed by the interference cancellation of a signal received via a first antenna, $\hat{x}_{1,k}^{(1)}$ denotes a candidate symbol value of a signal $x_1$ received over the first antenna, $\hat{x}_{2,k}^{(1)}$ denotes the other candidate symbol vector calculated using the vector of the changed receive signal, and C denotes a total number of the first hard decision value and neighbor candidate values, C being equal to or smaller than a modulation order M, and $$z_k^{(2)} = y - h_2 \hat{x}_{2,k}^{(2)} \Rightarrow \begin{bmatrix} z_{1,k}^{(2)} \\ z_{2,k}^{(2)} \end{bmatrix} = \begin{bmatrix} y_1 \\ y_2 \end{bmatrix} - \begin{bmatrix} h_{12} \\ h_{22} \end{bmatrix} \hat{x}_{2,k}^{(2)}$$

$$k \in \{0, 1, \ldots, M-1\}$$

$$\hat{x}_{1,k}^{(2)} = Q(h_1^H z_k^{(2)}) \; k \in \{0, 1, \ldots C-1\}, h_1 = \begin{bmatrix} h_{11} \\ h_{21} \end{bmatrix}$$

where $z_k^{(2)}$ denotes a vector of a receive signal changed by the interference cancellation of a signal received via a second antenna, $\hat{x}_{1,k}^{(2)}$ denotes a candidate symbol value of a signal $x_2$ received over the second antenna, $\hat{x}_{2,k}^{(2)}$ denotes other candidate symbol vector to calculate using the vector of the changed receive signal, and C denotes the total number of the first hard decision value and the neighbor candidate values, C being equal to or smaller than the modulation order M.

7. A receiving method in a multi-antenna system, comprising:

confirming an initial hard decision value of a receive symbol vector;

selecting one or more candidate symbols restricted to neighbor values of the initial hard decision value;

canceling interference in the selected candidate symbols and selecting final candidate symbols from the received symbols using a result of the interference cancellation; and estimating a receive symbol using the final candidate symbols, wherein selecting one or more candidate symbols restricted to the neighbor values of the initial hard decision value comprises determining a number of candidate symbols by referring to a candidate symbol mapping table which defines the number of candidate symbols based on a modulation order and a spatial spreading factor value, and selecting candidate symbols corresponding to the number of the candidate symbols.

8. The receiving method of claim 7, wherein estimating the receive symbol using the final candidate symbols comprises:

calculating Euclidean distances of the selected candidate symbols; and calculating Log Likelihood Ratios (LLRs) of data bits using the acquired Euclidean distances.

9. The receiving method of claim 7, wherein selecting one or more candidate symbols restricted to the neighbor values of the initial hard decision value further comprises:

calculating a spatial spreading factor; and determining the number of candidate symbols corresponding to the spatial spreading factor.

10. The receiving method of claim 9, wherein the candidate symbol mapping table defines the number of candidate symbols based on the modulation order and the spatial spreading factor value as follows:

| Modulation order | Spatial spreading factor (rounded off) | | |
|---|---|---|---|
| | below $T_1$ dB | over $T_1$ dB and below $T_2$ dB | over $T_2$ dB |
| QPSK | 1 candidate symbol (MMSE) | 3 candidate symbols (MMSE-MML) | 4 candidate symbols (MML) |
| 16QAM | 1 candidate symbol (MMSE) | 7 candidate symbols (MMSE-MML) | 16 candidate symbols (MML) |
| 64QAM | 1 candidate symbol (MMSE) | 33 candidate symbols (MMSE-MML) | 64 candidate symbols (MML). |

11. The receiving method of claim 9, wherein the candidate symbols are selected within a cross-shaped range based on the initial hard decision value so as to prevent abnormal operations in the LLR calculation.

12. The receiving method of claim 7, wherein confirming the initial hard decision value of the receive symbol vector comprises using the following equation:

$$z = \begin{bmatrix} z_1 \\ z_2 \end{bmatrix} = W_{MMSE} y = \left( H^H + \frac{\sigma_u^2}{\sigma_x^2} I \right)^{-1} H^H y$$

$$\Rightarrow \hat{x}_{init} = \begin{bmatrix} \hat{x}_{1,init} \\ \hat{x}_{2,init} \end{bmatrix} = \begin{bmatrix} Q(z_1) \\ Q(z_2) \end{bmatrix}$$

where z denotes a receive signal changed after a Minimum Mean Square Error (MMSE) nulling, $W_{MMSE}$ denotes a weight matrix multiplied by the receive signal for the MMSE nulling, $\sigma_u^2$ denotes an average power of a background noise, $\sigma_x^2$ denotes an average power of a transmit symbol, and $\hat{x}_{init}$ denotes the initial hard decision value of the symbol vector.

13. The receiving method of claim 7, wherein selecting the candidate symbols from the received symbols comprises using the following equations:

$$z_k^{(1)} = y - h_1 \hat{x}_{1,k}^{(1)} \Rightarrow \begin{bmatrix} z_{1,k}^{(1)} \\ z_{2,k}^{(1)} \end{bmatrix} = \begin{bmatrix} y_1 \\ y_2 \end{bmatrix} - \begin{bmatrix} h_{11} \\ h_{21} \end{bmatrix} \hat{x}_{1,k}^{(1)}$$

$$k \in \{0, 1, \ldots, M-1\}$$

$$\hat{x}_{2,k}^{(1)} = Q(h_2^H z_k^{(1)}) \; k \in \{0, 1, \ldots C-1\}, h_2 = \begin{bmatrix} h_{12} \\ h_{22} \end{bmatrix}$$

where $z_k^{(1)}$ denotes a vector of a receive signal changed by the interference cancellation of a signal received via a first antenna $\hat{x}_{1,k}^{(1)}$ denotes a candidate symbol value of a signal $x_1$ received over the first antenna, $\hat{x}_{2,k}^{(1)}$ denotes other candidate symbol vectors calculated using the vector of the changed receive signal, and C denotes a total number of the first hard decision value and neighbor candidate values, C being equal to or smaller than a modulation order M, and $$z_k^{(2)} = y - h_2 \hat{x}_{2,k}^{(2)} \Rightarrow \begin{bmatrix} z_{1,k}^{(2)} \\ z_{2,k}^{(2)} \end{bmatrix} = \begin{bmatrix} y_1 \\ y_2 \end{bmatrix} - \begin{bmatrix} h_{12} \\ h_{22} \end{bmatrix} \hat{x}_{2,k}^{(2)}$$

$$k \in \{0, 1, \ldots, M-1\}$$

$$\hat{x}_{1,k}^{(2)} = Q(h_1^H z_k^{(2)}) \ k \in \{0, 1, \ldots C-1\}, h_1 = \begin{bmatrix} h_{11} \\ h_{21} \end{bmatrix}$$

where $z_k^{(2)}$ denotes a vector of a receive signal changed by the interference cancellation of a signal received via a second antenna, $\hat{x}_{1,k}^{(2)}$ enotes a candidate symbol value of a signal $x_2$ received over the second antenna, $\hat{x}_{2,k}^{(2)}$ denotes other candidate symbol vectors calculated using the vector of the changed receive signal, and C denotes the total number of the first hard decision value and the neighbor candidate values, C being equal to or smaller than the modulation order M.

14. A receiving apparatus in a multi-antenna system, comprising:
a hard decision part configured to confirm an initial hard decision value of a receive symbol vector;
a candidate symbol selector configured to select one or more candidate symbols restricted to neighbor values of the initial hard decision value;
an interference canceller configured to cancel interference in the selected candidate symbols and select a final candidate symbol among the received symbols using a result of the interference cancellation; and
a symbol estimator configured to estimate a receive symbol using the final candidate symbol,
wherein the hard decision part is configured to confirm the initial hard decision value of the receive symbol vector based on the following equation:

$$z = \begin{bmatrix} z_1 \\ z_2 \end{bmatrix} = W_{MMSE} y = \left( H^H + \frac{\sigma_u^2}{\sigma_x^2} I \right)^{-1} H^H y \Rightarrow \hat{x}_{init} = \begin{bmatrix} \hat{x}_{1,init} \\ \hat{x}_{2,init} \end{bmatrix} = \begin{bmatrix} Q(z_1) \\ Q(z_2) \end{bmatrix}$$

where z denotes a receive signal changed after a Minimum Mean Square Error (MMSE) nulling, $W_{MMSE}$ denotes a weight matrix multiplied by the receive signal for the MMSE nulling, $\sigma_u^2$ denotes an average power of a background noise, $\sigma_x^2$ denotes an average power of a transmit symbol, and $\hat{x}_{init}$ denotes the initial hard decision value of the symbol vector.

15. The receiving apparatus of claim 14, wherein the symbol estimator comprises:
a Euclidean distance calculator configured to calculate Euclidean distances of the selected candidate symbols; and
a Log Likelihood Ratio (LLR) calculator configured to calculate Log Likelihood Ratios of data bits using the acquired Euclidean distances.

16. The receiving apparatus of claim 14, wherein the candidate symbol selector is configured to determine the number of candidate symbols by referring to a candidate symbol mapping table that defines the number of candidate symbols based on a modulation order and a spatial spreading factor value, and select candidate symbols corresponding to the number of the candidate symbols.

17. The receiving apparatus of claim 16, wherein the candidate symbol mapping table defines the number of candidate symbols based on the modulation order and the spatial spreading factor value as follows:

| Modulation order | Spatial spreading factor (rounded off) | | |
|---|---|---|---|
| | below $T_1$dB | over $T_1$dB and below $T_2$dB | over $T_2$dB |
| QPSK | 1 candidate symbol (MMSE) | 3 candidate symbols (MMSE-MML) | 4 candidate symbols (MML) |
| 16QAM | 1 candidate symbol (MMSE) | 7 candidate symbols (MMSE-MML) | 16 candidate symbols (MML) |
| 64QAM | 1 candidate symbol (MMSE) | 33 candidate symbols (MMSE-MML) | 64 candidate symbols (MML). |

18. The receiving apparatus of claim 17, wherein the candidate symbol selector is configured to prevent abnormal operations in the LLR calculation by selecting candidate symbols within a cross-shaped range based on the initial hard decision value.

19. The receiving apparatus of claim 14, wherein the candidate symbol selector is configured to select the candidate symbols from the received symbols based on the following equations:

$$z_k^{(1)} = y - h_1 \hat{x}_{1,k}^{(1)} \Rightarrow \begin{bmatrix} z_{1,k}^{(1)} \\ z_{2,k}^{(1)} \end{bmatrix} = \begin{bmatrix} y_1 \\ y_2 \end{bmatrix} - \begin{bmatrix} h_{11} \\ h_{21} \end{bmatrix} \hat{x}_{1,k}^{(1)} \ k \in \{0, 1, \ldots, M-1\}$$

$$\hat{x}_{2,k}^{(1)} = Q(h_2^H z_k^{(1)}) \ k \in \{0, 1, \ldots, C-1\}, h_2 = \begin{bmatrix} h_{12} \\ h_{22} \end{bmatrix}$$

where $z_k^{(1)}$ denotes a vector of a receive signal changed by the interference cancellation of a signal received via a first antenna, $\hat{x}_{1,k}^{(1)}$ denotes a candidate symbol value of a signal $x_1$ received over the first antenna, $\hat{x}_{2,k}^{(1)}$ denotes the other candidate symbol vector calculated using the vector of the changed receive signal, and C denotes a total number of the first hard decision value and neighbor candidate values, C being equal to or smaller than a modulation order M, and $$z_k^{(2)} = y - h_2 \hat{x}_{2,k}^{(2)} \Rightarrow \begin{bmatrix} z_{1,k}^{(2)} \\ z_{2,k}^{(2)} \end{bmatrix} = \begin{bmatrix} y_1 \\ y_2 \end{bmatrix} - \begin{bmatrix} h_{12} \\ h_{22} \end{bmatrix} \hat{x}_{2,k}^{(2)} \ k \in \{0, 1, \ldots, M-1\}$$

$$\hat{x}_{1,k}^{(2)} = Q(h_1^H z_k^{(2)}) \ k \in \{0, 1, \ldots, C-1\}, h_1 = \begin{bmatrix} h_{11} \\ h_{21} \end{bmatrix}$$

where $z_k^{(2)}$ denotes a vector of a receive signal changed by the interference cancellation of a signal received via a second antenna, $\hat{x}_{1,k}^{(2)}$ denotes a candidate symbol value of a signal $x_2$ received over the second antenna, $\hat{x}_{2,k}^{(2)}$ denotes other candidate symbol vector to calculate using the vector of the changed receive signal, and C denotes the total number of the first hard decision value and the neighbor candidate values, C being equal to or smaller than the modulation order M.

20. The receiving apparatus of claim 15, wherein the candidate symbol selector is configured to determine the number of candidate symbols by referring to a candidate symbol mapping table that defines the number of candidate symbols based on a modulation order and a spatial spreading factor value, and select candidate symbols corresponding to the number of the candidate symbols.

* * * * *